3,615,148
WATER SYSTEM FOR STEAM RANGES
Sydney Simon, Pittsburgh, Pa., assignor to Sydney Simon and Morris Simon, Pittsburgh, Pa.
Filed Feb. 4, 1969, Ser. No. 796,374
Int. Cl. A21b 1/08
U.S. Cl. 126—20                                              12 Claims

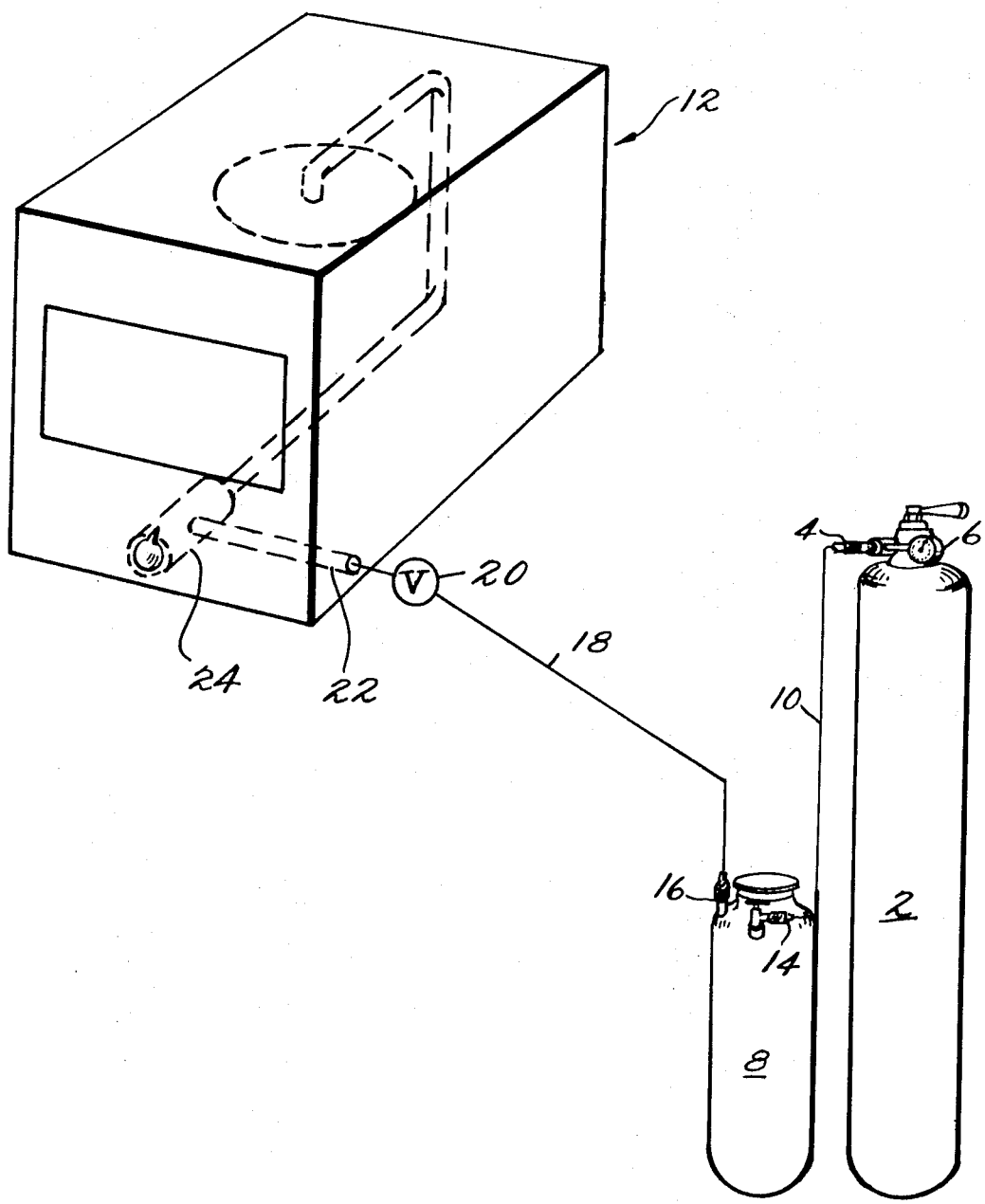

ABSTRACT OF THE DISCLOSURE

A portable adaptable water feeding system for steam ranges comprising an apparatus utilizing pressurized gas to retard or prevent the growth of bacteria and as a pump to drive fluid from a tank into the steam generating chamber of a food steamer or cooking appliance.

This invention relates to a portable water feeding system for steam heating devices and more particularly a portable gas pump apparatus which pumps a controlled amount of fluid into a steam chamber of a steam heating device.

In present water feed devices it is difficult to maintain the fluid reservoir or tank in a sanitary condition. Mold and bacteria grow in the fluid reservoir causing a slime or film to form. When the water is used in the steam chamber, of a steam heating device, slime and bacteria growth can clog or obstruct the steam apertures and other small orifices of the steaming apparatus. This clogging or obstruction causes serious maintenance problems resulting in loss of time, increased costs and an interruption in the food production process.

Another problem, with the water feed apparatus now in use is in the usage of fluid for the steamer. Today's water often contains large amounts of chemicals and in many cases has a high mineral content. When the water is steamed, the taste of the food may be changed due to the chemical or mineral content of the water. When the water stands in the fluid reservoir or tank or is converted to steam, deposits of chemicals or minerals are collected on the apparatus surface thus cutting down on the life expectancy of the apparatus and causing increased maintenance costs.

The present invention has for its principal objectives the utilization of an interchangeable, pressurized, closed gas reservoir or tank which has the dual function of providing the pressure used to pump a fluid into a steam heating device and preventing bacterial growth in the fluid; and a portable interchangeable closed tank containing fluid which is fed in a controlled flow into a steam heating device.

In particular, a preferred embodiment utilizes pressurized carbon dioxide gas to treat the fluid such as distilled water and to act as a pumping means for the fluid. However, it is noted that inert gas of which nitrogen is an example, may be substituted for or mixed with the carbon dioxide gas.

The distilled water is contained in a separate tank or reservoir connected to the pressurized gas receptacle by a flexible line and kept under a constant pressure. By pressurizing the distilled water, carbon dioxide gas is impregnated throughout the fluid, thus preventing bacterial growth. The pressurized carbon dioxide gas has been found to practically destroy all living organisms in the distilled water and to inhibit the growth or development of the organisms as long as pressure is maintained on the fluid. The carbonated distilled water, when released under pressure from the pressurized fluid container by either manual or automatic valve means, is forced through a flexible line into a steam heating device. By using the improved invention no deposits of chemicals, minerals or bacterial growth will appear on the apertures or orifices in the steam chamber and the taste of cooked foodstuffs will remain unchanged.

Other features of the invention are its low production costs, easy maintenance, adaptability to any steam heating device and portability to fit any designated area.

The invention will now be more fully described with reference to the accompanying drawing wherein:

The single figure shows a side elevation of the portable water feeding system for steam ranges showing the elements of the apparatus.

As shown by the figure the water feeding system for steam ranges comprises a closed pressurized gas reservoir or tank 2. The tank is airtight and is pressurized at a pressure greater than one atmosphere. The preferred tank used is a standard commercial tank which can be pressurized from 750 to 1200 p.s.i. The tank is provided with a discharge conduit 4 closely fitted to the tank to prevent any leakage of gas. A pressure indicator 6 is located on top of the tank to indicate the present pressure of the tank. However, if desired, any other indicator or no indicator at all may be utilized. The tank may be of any desired shape or size and may keep the gas under any desired pressure. The discharge conduit of the pressurized gas tank is connected with a fluid tank 8 by means of gas line or tube 10. The tube 10 may be constructed of flexible material such as plastics, rubber, rubberized material, or of a rigid material such as copper. One type of tubing used is plastic tubing but it is noted that other kinds of tubing can be used. The tube 10 is secured to the discharge conduit 4 of the pressurized gas tank with the other end of the tube 10 fitted to a gas inlet conduit 14 of a fluid reservoir or tank 8. The ends of the tube may be secured to the respective conduits by force fitting, clamping, screw fitting or other suitable means for securing the tube or line onto the respective conduits. However, screw fittings are preferably used on the tube ends to connect with threaded conduits. The fluid tank 8 is fitted with an inlet conduit 14 to receive the pressurized gas and an outlet conduit 16 to dispense the pressurized contained fluid. The conduits of the gas tank and fluid tank can be threaded to receive the threaded ends of the tube. The fluid tank or reservoir may be of any desired shape or size as is needed for the particular usage. The fluid tank can be filled as needed or refilled for reuse. The fluid tank may be provided with an aperture, or means in its body for filling and refilling the tank with fluid. Any suitable closure means such as a snap lid or screw lid may be utilized to seal the tank airtight. The above mentioned examples are not limiting as any desired closure can be utilized. Also, such closure means will enable the pressure of the fluid tank to be kept from dissipating from the tank, and if it is desired, prefilled tanks can be utilized. The inlet conduit 14 and the outlet conduit 16 may be located at any desirable position on the fluid tank body. The outlet conduit of the fluid tank 8 or the steam heating device 12 may contain a flow control valve which may be operated by manual or automatic means. The line or tube is closely connected to the outlet or discharge conduit of the fluid tank by any suitable means so that the pressurized fluid cannot escape. In the preferred embodiment the fluid discharge line or tube 18 is provided with a flow control valve 20, which can be operated manually or automatically. If the valve is automatically operated a solenoid may be used. The solenoid can be activated by moisture or temperature means located in the steam heating device 12. The steam heating device engaging end of the discharge line or tube 18 is provided with an adapter means 22 on its end so that the discharge line or tube 18 can be fastened onto any standard steam chamber, or fluid feed mechanism 24 of the steam heating device 12. The tube may be force fit over a steam chamber feed tube or fluid feed mechanism or can be secured by clamping or screwing means.

Examples of standard water feed steam chambers to which the present invention can be adapted are shown by the food steamer in the patent to Lewis, No. 3,069,994 of Dec. 25, 1962 and the cooking apparatus of Chase et al., No. 3,077,530, of Feb. 12, 1963. It is understood however that the above mentioned steam heating devices are illustrative and do not limit the present invention's application.

In the operation of the water feed system, pressurized gas from an airtight tank permeates and pressurizes fluid in a closed tank. The gas acts as a bacterial preventive agent, and keeps the distilled water under a greater than one atmosphere pressure so that the fluid is pumped through a fluid discharge line in which a valve controls the flow of the fluid into the steam heating device.

Although the present invention has been disclosed and illustrated in conjunction with various embodiments, it is to be understood that modifications and variations may be resorted to without departing from the spirit of the invention as those skilled in the art will readily understand. Such modifications and variations are considered to be within the purview and scope of the present invention as defined by the appended claims.

What is claimed is:

1. An improved steam heating apparatus with water feeding means, said apparatus comprising in combination:
   a steam heating device,
   an airtight tank containing gas at least partially comprising carbon dioxide under pressure greater than one atmosphere,
   a secondary air tight tank, means for carrying said gas to said secondary airtight tank,
   said secondary airtight tank containing water which is placed under pressure from said pressurized gas and carbonated to substantially retard bacteria growth therein,
   means for carrying said pressurized water to said heating device, and
   means for controlling the flow of said pressurized water into said steam heating device.

2. An improved steam heating apparatus with water feeding means, said apparatus comprising in combination:
   a steam heating device,
   an airtight tank having a discharge conduit,
   said airtight tank containing carbon dioxide under pressure greater than one atmosphere,
   a tube having one end engaging said carbon dioxide tank discharge conduit,
   a second airtight tank,
   said tube's other end engaging an in-take conduit of said second airtight tank,
   said second airtight tank also having a discharge conduit, and containing distilled water,
   means for securing one end of said tube airtight to said carbon dioxide tank discharge conduit and the other end of said tube airtight to said second distilled water tank in-take conduit,
   a second tube having one end engaging said second distilled water tank discharge conduit and the other end of said second tube engaging a feed mechanism of said steam heating device, and
   valve means for controlling the flow of distilled water from said second distilled water tank to said feed mechanism of said steam heating device.

3. A method of feeding and heating water in a steam heating device comprising the steps of:
   placing water in a tank, in contact with and under pressure from a pressurized gas at least partially comprising carbon dioxide,
   retaining said water in an atmosphere of said gas at a pressure greater than one atmosphere,
   feeding said pressurized water into a steam heating device by the force exerted by said pressurized gas, and
   steam heating the water in said steam heating device.

4. A method of feeding and heating water in a steam heating device comprising the steps of:
   placing water in a tank, in contact with and under pressure from a pressurized gas at least partially comprising carbon dioxide,
   retaining said water in an atmosphere of said gas at a pressure greater than one atmosphere,
   feeding said pressurized water into a steam heating device by utilizing forces exerted by said pressurized gas,
   controlling the flow of said pressurized water into said steam heating device, and
   steam heating the water in said steam heating device.

5. A method of feeding water into a steam heating device of claim 4 wherein said water is distilled water.

6. The method of feeding water into a steam heating device of claim 5 wherein said gas is substantially completely comprised of carbon dioxide.

7. A method of feeding and heating water in a steam heating device comprising the steps of:
   placing water in a tank, in contact with and under pressure from a pressurized gas at least partially comprising carbon dioxide,
   retaining said water in an atmosphere of said gas at a pressure greater than one atmosphere to destroy and retard the development of bacteria therein,
   feeding said pressurized water into a steam heating device by utilizing forces developed by said pressurized gas,
   controlling the flow of said pressurized water into said steam heating device, and
   steam heating the water in said steam heating device.

8. The method of feeding water into a steam heating device of claim 7 wherein said water is distilled water.

9. The method of feeding water into a steam heating device of claim 8 wherein said gas is substantially completely carbon dioxide.

10. A new use for a pressurized fluid feeding apparatus having; an airtight first tank for containing a gas under pressure greater than one atmosphere, a secondary airtight tank for containing a fluid, first means for carrying said gas under pressure to said secondary tank and second means for carrying said fluid from said secondary tank in response to the pressure of said pressurized gas, said new use comprising the steps of:
   maintaining pressurized carbon dioxide in said first tank,
   maintaining water in said secondary tank which becomes carbonated under the influence of said pressurized carbon dioxide thereby substantially preventing bacterial growth therein,
   controllably feeding said carbonated water to a steam heating device via said second means, and
   steam heating the water in said steam heating device.

11. A new use as in claim 10 wherein said water is distilled water.

12. An improvement for use with a steam heating device which requires the delivery of pressurized water thereto for conversion to steam in the heating process, said improvement comprising;
- a steam heating device,
- an airtight tank for containing a gas at least partially comprising carbon dioxide under a pressure greater than one atmosphere,
- means for carrying said gas to a secondary airtight tank,
- said secondary airtight tank adapted to contain water under pressure from said gas and carbonated by said gas to substantially retard bacteria growth therein,
- means for carrying said pressurized water to said steam heating device, and
- means for controlling the flow of said pressurized water into said steam heating device.

References Cited
UNITED STATES PATENTS

| | | | |
|---|---|---|---|
| 2,630,249 | 3/1953 | Bryant et al. | 222—399 |
| 2,865,534 | 12/1958 | Barnes | 222—399 |

ROBERT B. REEVES, Primary Examiner

J. P. SHANNON, Jr., Assistant Examiner